Patented Apr. 17, 1934

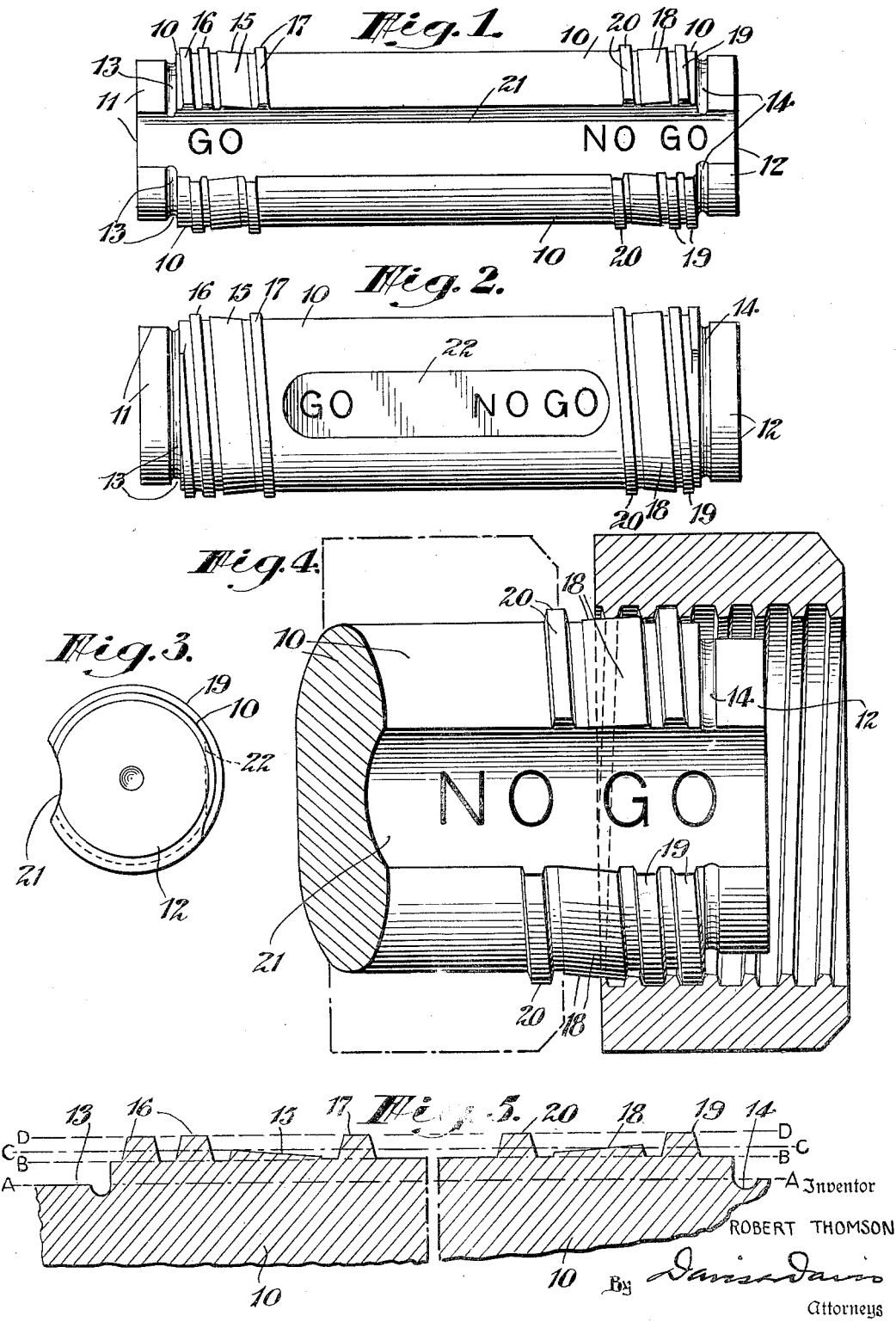

1,954,852

UNITED STATES PATENT OFFICE 1,954,852

SCREW THREAD GAUGE

Robert Thomson, Arlington, N. J., assignor to Dardelet Threadlock Corporation, New York, N. Y., a corporation of Delaware Application July 26, 1932, Serial No. 624,676

15 Claims. (Cl. 33—199)

This invention relates to improvements in screw thread gauges, and more particularly to gauges of the plug type for testing internal screw threads on nuts or other internally threaded parts.

The principal objects of the invention are to provide a gauge having improved means for testing internal screw threads as to minor diameter; to provide a plug gauge having "go" and "no go" portions with improved means for determining the acceptability of a thread as to its minor diameter; to provide an efficient "go" and "no go" gauge of the plug type for testing the minor diameter of internal Dardelet locking screw threads; and to provide a gauge for testing an internal thread for accuracy as to dimensions other than minor diameter by means of a gauge thread and for testing said internal thread for accuracy as to minor diameter by a separate gauging surface on the gauge as the internal thread of the nut or other part is screwed on the gauge thread.

Internal Dardelet locking threads have a conoidal crest surface making an angle of six degrees with the thread axis. It is important that the threads be accurately formed with respect to minor diameter in order that their crest surfaces may effectively wedge upon the correspondingly conoidal root surfaces of external Dardelet locking threads, and an important purpose of the present invention is to provide a "go" and "no go" gauge especially adapted for efficiently testing internal Dardelet threads to quickly determine the accuracy of generation of their conoidal crest surfaces without danger of injuring or marring said conoidal crest surfaces.

In the accompanying drawing, wherein the invention is shown embodied in a "go" and "no go" gauge for testing internal Dardelet threads:

Fig. 1 is a side view of the gauge;

Fig. 2 is a similar view of the gauge as it appears when viewed from a diametrically opposite point;

Fig. 3 is an end view, looking at the "no go" end of the gauge;

Fig. 4 is a fragmentary side view of the gauge, showing the crest of the thread of an acceptable nut binding on the minor diameter gauging surface of the "no go" end portion of the gauge; and Fig. 5 is a fragmentary longitudinal sectional view showing the "go" and "no go" end portions of the gauge on an enlarged scale.

Referring to the drawing by numerals, the gauge comprises a cylindrical metal plug having a main body portion 10 and two reduced end portions 11 and 12, circumferential grooves 13 and 14 being provided between the body portion and the respective end portions of the plug. Except as hereinafter described, the cylindrical main body portion and cylindrical end portions are of constant diameter from end to end of each such portion, the reduced end portions being of equal diameter.

Adjacent each end of the main body portion 10 of the plug, said main body portion is formed with two raised external screw threads and an intermediate raised peripheral gauging surface, about or over which gauging surface the two adjacent threads are adapted to guide the crest of a nut thread, or other internal thread, to be tested when the nut or other internally threaded element is screwed on that end of the plug. The minor-diameter gauging surface 15 on the "go" gauge part of the plug has the two screw threads 16 and 17 at opposite ends thereof, while the minor-diameter gauging surface 18 on the "no go" part of the plug has the two screw threads 19 and 20 at opposite ends thereof.

The radial size of gauging surface 18 is slightly greater than that of surface 15, as shown more clearly in Fig. 5, in which line A—A is parallel with the plug axis at a radius equal to that of end portions 11 and 12; line B—B is parallel to A—A at a radius equal to that of the body portion 10; line C—C is parallel to B—B but on a slightly greater radius, and line D—D is parallel to the other lines on a radius equal to that of the crest of the plug threads. All the plug threads are of identical size, shape and pitch, and the two threads separated by each minor-diameter gauging surface lie in a common helix. The plug threads are shaped to conform with the shape of the thread groove of the thread to be tested, this latter thread in the case of the gauge illustrated being the internal Dardelet locking screw thread shown, for example, on the nut illustrated in Fig. 4.

Each of the gauging surfaces 15 and 18 is a conoidal surface of constant width and extends substantially entirely around the plug in a helical path of the same pitch as that in which the plug threads extend around the plug. Each surface 15 and 18 makes an angle of six degrees with the plug and thread axes, said angle corresponding with that which the crest surface of the Dardelet internal thread makes with the thread axis. Each gauging surface 15 and 18 is so disposed that the adjacent plug threads will guide the crest of a nut or other internal thread about the periphery of that portion of the plug having such gauging surface. Preferably, as shown, each gauging surface 15 and 18 is made wide enough and long enough to insure the extension therearound of at least one full turn of the crest of a nut thread screwed on the plug before said nut thread reaches the plug thread at the inner end of said gauging surface. In other words, in the gauge shown, each gauging surface extends over that part of the plug which would be occupied by two turns of the thread and the intermediate turn of the thread groove if the two adjacent threads were a single continuous thread.

It will be obvious, therefore, if a nut, for example, is screwed on the "go" end of the plug, the crest of the nut thread will bind on surface 15 if the minor diameter of the nut thread is too small. If the nut can be screwed past surface 15 on to the inner thread 17 it will indicate that the minor diameter of the nut thread is equal to or above the minimum allowed. If the nut be then unscrewed and subsequently screwed on the "no go" end of the plug, and the crest of the nut thread binds on surface 18 before the nut is screwed past surface 18 on to the inner thread 20 (as shown in full lines in Fig. 4), this fact will indicate that the minor diameter of the nut thread does not exceed the maximum tolerance limit. If the nut can be screwed on to inner thread 20, as indicated in dotted lines in Fig. 4, the minor diameter of the nut thread is too great.

While the threads at the ends of the two minor diameter gauging surfaces may be used solely for the purposes above described, they are in the gauge shown, and preferably, made of such size as to have a gauging function particularly important in gauging internal Dardelet threads. Since Dardelet threads lock by the wedging of the conoidal crest of the internal thread on the conoidal root of the external thread by reason of sidewise displacement of said threads while screwed together, it is important that the spacing of the thread convolutions (width of thread groove) shall be large enough to permit such relative sidewise movement of the coupled Dardelet threads. It is also necessary that the major diameter of the internal thread shall not be too small. Accordingly, therefore, in the gauge shown, the major diameter of the plug threads is equal to the smallest permissible major diameter for the nut thread the gauge is to test, and the thickness of said plug threads is equal to the smallest permissible spacing for the turns of the nut thread the gauge is to test. In Fig. 4 a nut is shown on the gauge in which the major diameter of the nut thread and the width of the nut thread groove both slightly exceed the minimum requirements, while the minor diameter of the nut thread is within the maximum tolerance limit since the crest of the nut thread has become bound on gauging surface 18.

The reduced end portions 11 and 12 serve as a guide and prevent attempts to force onto the outer threads 16 and 19 nuts whose minor diameter is much smaller than the minimum, and also serve to prevent battering or mutilation of the ends or outer threads of the main body portion of the gauge. The grooves 13 and 14 facilitate manufacture of the gauge by affording tool clearance and also facilitate entering the nut thread on the outer threads 16 and 19 of the plug.

The plug gauge shown is provided with a longitudinal groove 21 affording tool clearance in manufacturing the gauge, particularly in grinding the minor diameter gauging surfaces 15 and 18.

Diametrically opposite groove 21 the main body portion is flatted between the inner threads 17 and 20 to provide a flat surface 22 on the appropriate opposite end portions of which are stamped respectively the indicia "Go" and "No Go". Similar indicia may be stamped or otherwise provided in the appropriate end portions of groove 21, as shown. Groove 21 and flat surface 22 assist an operative to maintain a non-slip grip on the plug while screwing a nut on and off the gauging ends of the plug.

While the invention has been shown embodied in a "go" and "no go" gauge for testing Dardelet threads, it will be obvious that it may be embodied in other types of gauges, and also in gauges for testing other kinds of threads.

The provision of a conoidal gauging surface between the two threads at each end of the plug permits testing the conoidal crest surface of Dardelet internal threads without danger of mutilating these surfaces which are designed to function as friction locking surfaces. The minor diameter of the plug threads is, as shown, less than the diameter of both of the gauging surfaces, or of any part of said surfaces about which the crest of a thread screwed on the plug threads can pass. In other words, in all cases the effective portions of the surfaces 15 and 18 should be of greater radial displacement from the plug axis than the roots of the plug threads.

The conoidal gauging surfaces 15 and 18 are of opposite taper, and that side edge of each said surface which is farthest from the plug axis is preferably disposed nearest the adjacent end of the plug, so that a nut to be tested may be screwed base first upon the gauge as illustrated, for example, in Fig. 4 in which a Dardelet locking nut is shown screwed base first upon the "no go" end of the gauge.

The outermost threads 16 and 19 prevent a nut from being screwed upon either end of the plug to the respective minor diameter gauging surfaces 15 and 18 if the thickness of the nut thread is too great, the pitch of the nut thread is too large or too small, the major diameter of the nut thread is too small, or all said conditions exist. Provision is, therefore, made for separate testing of the nut thread for accuracy as to minor diameter.

The innermost threads 17 and 20 make it possible to guide the crest of the nut thread over each minor diameter gauging surface until the said thread crest either binds on said surface or has passed over said surface throughout the length of the nut thread. It is thus possible to determine whether there is any convolution of the nut thread of sufficiently small minor diameter to bind on the "go" and "no go" minor diameter gauging surfaces 15 and 18.

What I claim is:

1. A gauge for internal screw threads comprising a member having a portion for entering internally threaded members to be tested by the gauge, said portion having thereon two spaced external screw threads and an intermediate peripheral gauging surface portion for testing the minor diameter of threads of members entered by said portion, said two external screw threads lying in a common helix with their roots closer to the thread axis than said intermediate peripheral gauging surface portion.

2. A gauge for internal screw threads comprising a plug having two spaced external threads of equal size and pitch lying in a common helix, said plug having between the adjacent ends of said two threads a minor diameter gauging peripheral surface having a greater radial displacement from the plug axis than the roots of said threads.

3. A gauge for internal screw threads comprising a plug having adjacent one end thereof two spaced external screw threads of equal size and pitch lying in a common helix, said plug having between the adjacent ends of said threads an intermediate surface extending substantially entirely around the plug, which surface has a greater radial displacement from the plug axis than the roots of said threads throughout that portion of the surface which lies in the same helical path as the roots of said threads to adapt said surface for testing the minor diameter of internal threads screwed on said end of the plug.

4. A gauge for internal screw threads comprising a member having adjacent one end thereof two spaced external screw threads of equal pitch lying in a common helix, said member having between the adjacent ends of said threads a minor diameter gauging surface portion which extends around said member and has a greater displacement from the thread axis than the roots of the threads in the helical path around the member in which the roots of the two threads lie.

5. A gauge for internal screw threads comprising a member having an entering end portion provided with two spaced screw threads of equal pitch lying in a common helix and an intermediate conoidal gauging surface portion extending around the member in a helical path of the same pitch as said threads, which conoidal surface portion has, in the common helical path in which the roots of the two threads lie, a radial displacement from the axial line of the threads greater than that of the thread roots.

6. A gauge for internal screw threads comprising a member having an external screw thread and an adjacent peripheral gauging surface upon which the crest of an internal thread is adapted to be guided by said external thread, said surface having a greater radial displacement from the axis of the external thread than the root of that thread.

7. A screw thread gauge comprising a plug having two spaced screw threads adjacent one end thereof and a peripheral gauging surface intermediate said threads, said threads being of equal size and pitch, and of the same profile, and lying in a common helix, the size of said threads corresponding with the minimum permissible size of the thread groove of an internal thread to be gauged, and said gauging surface intermediate the threads having a greater displacement from the plug axis than the thread roots in a helical path common to that in which the roots of said threads lie.

8. A screw thread gauge having an external screw thread which corresponds in cross-section with the cross-sectional shape and minimum permissible cross-sectional size of the thread groove of an internal screw thread the gauge is designed to test, and also having an adjacent peripheral minor-diameter-gauging surface over which said external thread is adapted to guide the crest of an internal thread screwed on the plug thread, which minor-diameter gauging surface has a greater radial displacement from the plug axis than the root of said external plug thread.

9. A gauge for Dardelet internal screw threads having a thread gauging end portion for entering internally threaded members which are to be tested by the gauge, which end portion is provided with two spaced external screw threads of equal size and pitch lying in a common helix and is also provided with a minor diameter gauging peripheral surface between said two spaced threads, which surface is inclined to the common axis of said threads transversely of the common helical path of the roots of said threads and has a greater radial displacement from said common axis than the thread roots in said common helical path.

10. A gauge for Dardelet internal screw threads, as claimed in claim 9, wherein the size of each of the two spaced threads corresponds to the minimum permissible size for the thread groove of a Dardelet internal screw thread on a member to be tested by the gauge.

11. A gauge for Dardelet internal screw threads having a thread gauging end portion which is provided with an external screw thread and an adjacent peripheral gauging surface over which the Dardelet internal screw thread is adapted to be guided by said external thread, said peripheral gauging surface being inclined to the axis of said external thread transversely of the helical path in which the external thread guides the Dardelet internal thread for gauging and having in said path a greater radial displacement from the axis of the external thread than the root of said external thread.

12. A screw thread gauge, as claimed in claim 11, wherein the external screw thread corresponds in cross-section with the cross-sectional shape and minimum cross-sectional size permissible for the thread groove of a Dardelet internal thread the gauge is designed to test.

13. In a gauge comprising a plug having "go" and "no go" gauging end sections for testing an internal screw thread, two spaced external screw threads of equal size and pitch on one of said end sections, said external threads lying in a common helix and said end section having between said two external threads an intermediate peripheral gauging surface, and said gauging surface and the roots of said external threads lying in a common helical path in which the radial displacement of the roots of said external threads from the axis of the plug is smaller than that of said gauging surface.

14. In a gauge having "go" and "no go" gauging end sections for testing a Dardelet internal screw thread, a "go" gauging end section having two spaced external screw threads of identical cross-section and pitch lying in a common helix and each corresponding in cross-section to the cross-sectional shape and minimum cross-sectional size permissible for the thread groove of the Dardelet thread the gauge is designed to test, the "go" gauging end section having between said two external threads a peripheral conoidal gauging surface which extends about said section in a helical path of the same pitch as that of the external threads, said gauging surface and the roots of the external threads lying in a common helix with the thread roots lying closer to the axis of the helix than said gauging surface, and the radial displacement of the gauging surface from said axis corresponding to the smallest permissible radial displacement of the crest surface of the Dardelet thread to be tested by the gauge from the axis of said Dardelet thread.

15. In a gauge having "go" and "no go" gauging end sections for testing a Dardelet internal screw thread, a "no go" gauging end section having two spaced external screw threads of the same size and pitch lying in a common helical path and an intermediate peripheral conoidal gauging surface which extends about said end section in a helical path of the same pitch as that of said external threads, said gauging surface and the roots of said external threads lying in a common helix, and the radial displacement of said gauging surface from the axis of said helix being greater than that of the thread roots and corresponding to the largest permissible radial displacement of the crest surface of the Dardelet thread to be tested by the gauge from the axis of said Dardelet thread.

ROBERT THOMSON.